United States Patent [19]

Nelson

[11] Patent Number: 5,212,489
[45] Date of Patent: May 18, 1993

[54] ECHO RANGING SYSTEM FOR DETECTING VELOCITY OF TARGETS USING COMPOSITE DOPPLER INVARIANT TRANSMISSIONS

[75] Inventor: David E. Nelson, Rochester, N.Y.

[73] Assignee: Hydroacoustics Inc., Rochester, N.Y.

[21] Appl. No.: 931,670

[22] Filed: Aug. 20, 1992

Related U.S. Application Data

[63] Continuation of Ser. No. 671,060, Mar. 18, 1991, abandoned.

[51] Int. Cl.$^5$ .................. G01S 13/58; G01S 15/58
[52] U.S. Cl. .................. 342/109; 342/108; 342/189; 364/724.11; 364/728.06; 367/100; 367/102
[58] Field of Search .................. 342/189, 108, 109; 364/724.11, 728.06; 367/100, 102

[56] References Cited

U.S. PATENT DOCUMENTS

| Re. 31,509 | 1/1984 | Neidell . | |
|---|---|---|---|
| 3,225,349 | 12/1965 | Thor | 342/162 |
| 3,579,180 | 5/1971 | Taddeo . | |
| 3,622,963 | 11/1971 | Sage et al. . | |
| 3,808,594 | 4/1974 | Cook et al. | 342/109 |
| 3,866,223 | 2/1975 | Crooke | 342/189 |
| 3,905,033 | 9/1975 | Moore et al. | 342/162 |
| 4,053,889 | 10/1977 | Johnson . | |
| 4,106,019 | 8/1978 | Alexander et al. . | |
| 4,398,274 | 8/1983 | Chotiros . | |
| 4,493,064 | 1/1985 | Odero et al. . | |
| 4,509,051 | 4/1985 | Lewis . | |
| 4,566,011 | 1/1986 | Lewis et al. . | |
| 4,697,186 | 9/1987 | Rock . | |
| 4,831,602 | 5/1989 | Kroenert et al. . | |

OTHER PUBLICATIONS

C. E. Cook & M. Bernfeld, "Radar Signals" Academic Press (1967) Chapter 4.
A. W. Rihaczek, "Principles of High Resolution Radar", 1985, pp. 111-114, 133, 168-212, 418-424.

Primary Examiner—Gilberto Barron, Jr.
Attorney, Agent, or Firm—M. LuKacher

[57] ABSTRACT

Target velocity and range are measured with high resolution in an echo ranging system (sonar or radar) using composite Doppler invariant signals consisting of at least two segments, such as "rooftop" or "vee" HFM signals, such composite signals having ambiguity functions that intersect along the zero-velocity time axis with ridge lines slanted in different directions. A single correlator is used for each segment wherein returns from the target are correlated with replicas of each segment of the composite signal to separately transform the Doppler frequency shifts of the target return into outputs whose time relationship provides a frame of reference for high resolution measurement of the velocity of the target. The time relationship measurement is implemented by a set of tapped delay lines and coherent summers which output a coherent correlation-like detection peak in a bin which corresponds to the target's velocity. Thus, one correlator for each transmission segment together with a tapped delay line and summer network may be used for velocity detection, with high precision range detection, based upon the timing of the detection peak with respect to the transmitted signal, also being implemented at the same time, thereby avoiding the classical need for an expensive bank of correlators (one for each velocity bin) and yielding significant economies for the simultaneous high resolution measurement of range and velocity for a target by means of echo ranging.

46 Claims, 17 Drawing Sheets

ECHO RANGING SYSTEM FOR DETECTING VELOCITY OF TARGETS USING COMPOSITE DOPPLER INVARIANT TRANSMISSIONS

This is a continuation of application Ser. No. 07/671,060, filed Mar. 18, 1991 now abandoned.

DESCRIPTION

The present invention relates to echo ranging systems (methods and apparatus), and more particularly to a system for detecting the velocity of a target from a return in response to a composite Doppler invariant signal transmission.

The invention is especially suitable for use in an echo ranging system wherein the simultaneous high resolution measurement of range and velocity of a target is desired; economies in the system being afforded by an implementation of coherent velocity analysis through the use of one correlator per composite signal segment together with a tapped delay line and summer network.

Doppler invariance is a concept well known in the field of high resolution radar and sonar where correlators or matched filters (equivalent devices) are used. Doppler invariant signals are signals where the matched filter or correlator output is independent of target velocity. Such signals are discussed in detail in the text, Principles of High Resolution Radar by A. W. Rihaczek. This text was first published in 1969 and a new edition was published by Peninsula Publishing, Los Altos, Cal. 94023 in 1985. Doppler invariance was a solution to the loss of correlation due to range rate. However the coupling of range and range rate produced uncertainty or ambiguity in the range output. The Doppler invariance characteristic of a signal is shown by its ambiguity function which is the matched filter response of this signal to Doppler shifted versions thereof, as displayed on the velocity-time plane. The problem of ambiguity and uncertainty and the ambiguity function of different signals and the concept of Doppler invariance is set forth particularly in Sections 4.4 and 6.5 of the Rihaczek text referenced above. Various Doppler invariant waveforms and their ambiguity functions are discussed in Section 6.3 through 6.5 of the text, as well as elsewhere in the text.

A particularly useful Doppler invariant waveform is the hyperbolic frequency modulation waveform which is produced during a sweep in frequency of the form $$f_i = F/(1-kt)$$

where F and k are constants, $f_i$ is the instantaneous frequency, and t is time. These constants may be varied to vary the frequency range and/or duration of the sweep. The name "hyperbolic" comes from the mathematical term, 1/t, in the description of this frequency vs. time characteristic. The ambiguity function of such a signal for an upsweep, (as illustrated in FIG. 1 of the accompanying drawings) is shown in FIG. 2. The ambiguity function of an HFM down sweep signal (as illustrated in FIG. 3) is shown in FIG. 4. A mathematical and qualitative description of the HFM signal and the Doppler invariance thereof is discussed in Section 12.1 of the Rihaczek text referenced above.

Waveforms of a composite nature have been proposed. These usually contain successive up and down sweeps. When an upsweep is followed by a down sweep, the signal is referred to as a "rooftop" signal. Where a down sweep is followed by an upsweep, the signal is referred to as a "vee" signal. Such signals are discussed in Section 6.3 of the Rihaczek text. A rooftop HFM signal is shown in FIG. 5 of the accompanying drawings and the ambiguity function thereof is shown in FIG. 6. As shown in FIG. 6, the ambiguity function is characterized by ridge lines within the velocity-time plane of the ambiguity function, which ridge lines are of different slope.

It is the principal feature of this invention to provide, in an echo ranging system, a processor which obtains velocity and range sensitive target detection from such composite Doppler invariant signals having segments of different slope as shown in FIG. 6 (wherein the different slopes are in opposite directions) even though the individual signal segments themselves are Doppler invariant.

Heretofore, Doppler invariant signals, such as HFM modulated signals, have been insensitive to target motion when used for radar or sonar in echo ranging. A single correlator was found satisfactory for all targets moving or stationary. However, the Doppler invariance made it impractical to use such signals for velocity measurement and particularly for measurement of velocity simultaneously with range. Range was determined on successive transmissions or pings (a ping being a transmission in the sonar sense), and the time difference in returns on successive transmissions or pings was measured to measure velocity (as range-rate). Echo location systems such as discussed in U.S. Pat. No. RE13509 of Jan. 24, 1984 have processors requiring successive transmissions for velocity measurement.

An alternative approach was to use a transmission sensitive to target motion, such as CW (continuous wave) or FSK (frequency shift keying). When these signals are used, a separate correlator must be provided for as many target velocities as are dictated by the resolution desired (see Rihaczek text on page 172). This solution is not always practical, since correlators are expensive signal processing devices and require special purpose integrated circuits or extensive software to implement them. Accordingly, the size and costs of the echo ranging system may become excessive or impractical.

Whereas the term "Doppler-invariant" is being used throughout this specification to denote a preferred signal waveform (perhaps, best represented by HFM or Hyperbolic Frequency Modulated signals), other related signal forms may be used as long as the correlation loss encountered with Doppler shifted returns is found acceptable. One such signal form could be, for example, Linear Frequency Modulated (LFM) signals. For small velocity shifts the performance differences between HFM and LFM may be indistinguishable. Any signal may be considered Doppler-invariant as long as the correlation loss for the greatest Doppler-shifted return to be encountered is considered acceptable to the user.

It is the principal object of the present invention to provide an improved system which utilizes composite Doppler invariant signals capable of measuring simultaneously target velocity and range using a single transmission, without requiring a bank of correlating devices, with one correlator for each velocity.

More specifically, it is an object of the invention to provide an improved echo ranging system utilizing returns from a composite (plural segment) Doppler invariant signal which is incident on the target.

It is a still further object of the present invention to provide an improved system for velocity and range measurement using a composite Doppler invariant transmission, such as the "vee" or "rooftop" HFM transmission.

It is a still further object of the invention to provide an improved system for the simultaneous measurement of velocity and range from a return of a composite Doppler invariant signal consisting of two or more segments, which system requires an individual correlator for each segment of the composite signal, but does not require a correlator for each velocity bin (the resolution of the velocity measurement which is desired).

It is a still further object of the present invention to provide an improved system for measuring velocity and range, using composite Doppler invariant signals wherein ambiguous echoes may be suppressed.

The invention arises from the discovery that a rooftop or vee composite Doppler invariant signal, or a simultaneous composite signal where the sweeps occupy the same interval, has velocity measurement sensitivity in spite of the Doppler invariant nature of the individual segments of the signal. The signal segments of the composite Doppler invariant signal occur successively during a transmission in the case of the roof top signal shown in FIG. 5. The signal segments can occur simultaneously during the transmission as shown in FIG. 5A. The ambiguity function of such a signal, either with successively or simultaneously occurring segments, as illustrated in FIG. 6, possesses two ridge lines that intersect to form an X having the crossover point on the zero-velocity time axis. There results a direct relationship between the time separation of the crossed ridge lines and the velocity axis which provides a direct means for the measurement of target velocity. A local time base is introduced, enabling velocity to be obtained from the processing of each composite return. It was found that the Doppler invariant nature of the segments of the composite signal provides a constant amplitude for the ridges, between which the time separations can be measured, thereby yielding a velocity measurement sensitivity that is invariant to velocity magnitude. Thus, a target echo arriving with velocity, and detected by two correlators, 1 for each segment of the two segment roof-top, vee, or simultaneous-crossed transmission, evokes two echoes whose displacement in time is unique for each and every velocity. The time relationship of the two outputs can be translated into a measurement of the velocity of the target. Such time delay measurements may be implemented by a set of tapped delay lines and summers which output a coherent correlation-like detection peak in a bin corresponding to the target velocity. The use of one correlator for each segment of the composite signal together with a tapped delay line and a summer network for coherent combination of the outputs from the correlators provides a practical and low cost means for the simultaneous high resolution definition of range and velocity for a target in an echo ranging system; the range being determinable by measuring the time delay between the transmission of the signal and the occurrence of the correlation-like detection peak of the target echo along the time axis of the detector output.

The foregoing and other objects, features and advantages of the invention as well as a presently preferred embodiment thereof will become more apparent from a reading of the following description in connection with the accompanying drawings in which.

FIGS. 1 through 6 illustrate the building blocks of and the preferred HFM modulation or signal which is transmitted in the form of a composite plural segment signal. While the rooftop or vee HFM is presently preferred for use in implementing the invention, in a general sense, the invention provides for transmitting a class of waveforms whose individual ambiguity functions accommodate the coherent construction of a frequency transformation of a Doppler (frequency) shifted echo return to measurable time delayed events.

Figure 15:
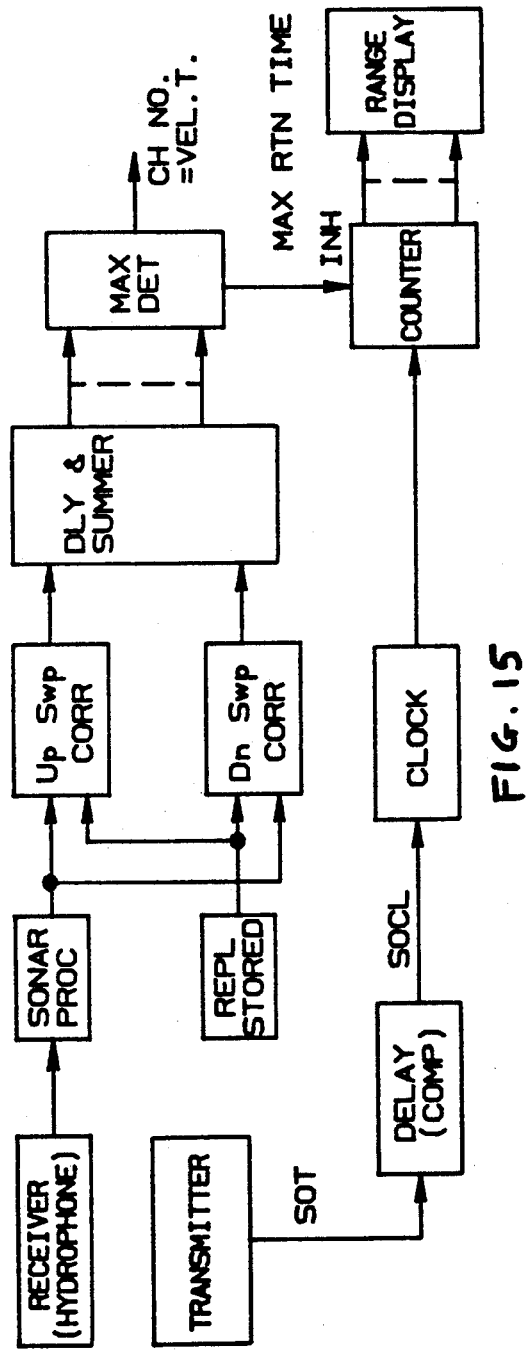
FIG. 15 is a block diagram of an echo ranging system for the simultaneous measurement of velocity and range from a single sweep or transmission of a composite Doppler invariant signal upon return thereof, after the transmission is incident on and reflected from a target.

The transmitter in which the composite Doppler invariant signal is generated, as well as its associated antenna (for radar) or projector (for sonar) is contained in the transmitter 10 as shown in FIG. 15.

Figure 9:
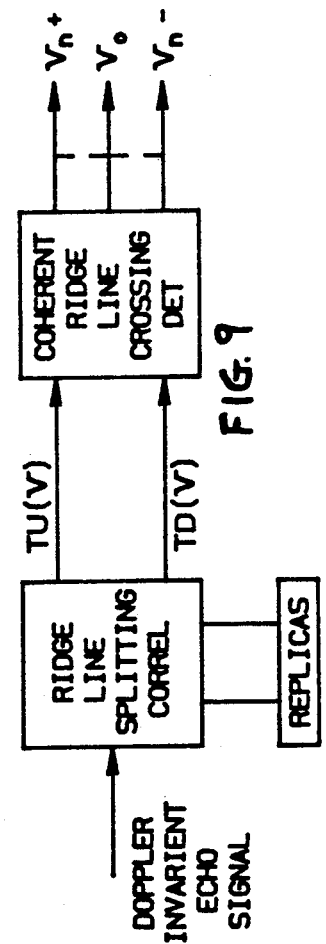
FIG. 9 is a simplified block diagram of the processor in accordance with the invention for measuring velocity from a single composite Doppler invariant echo signal.
Figure 11:
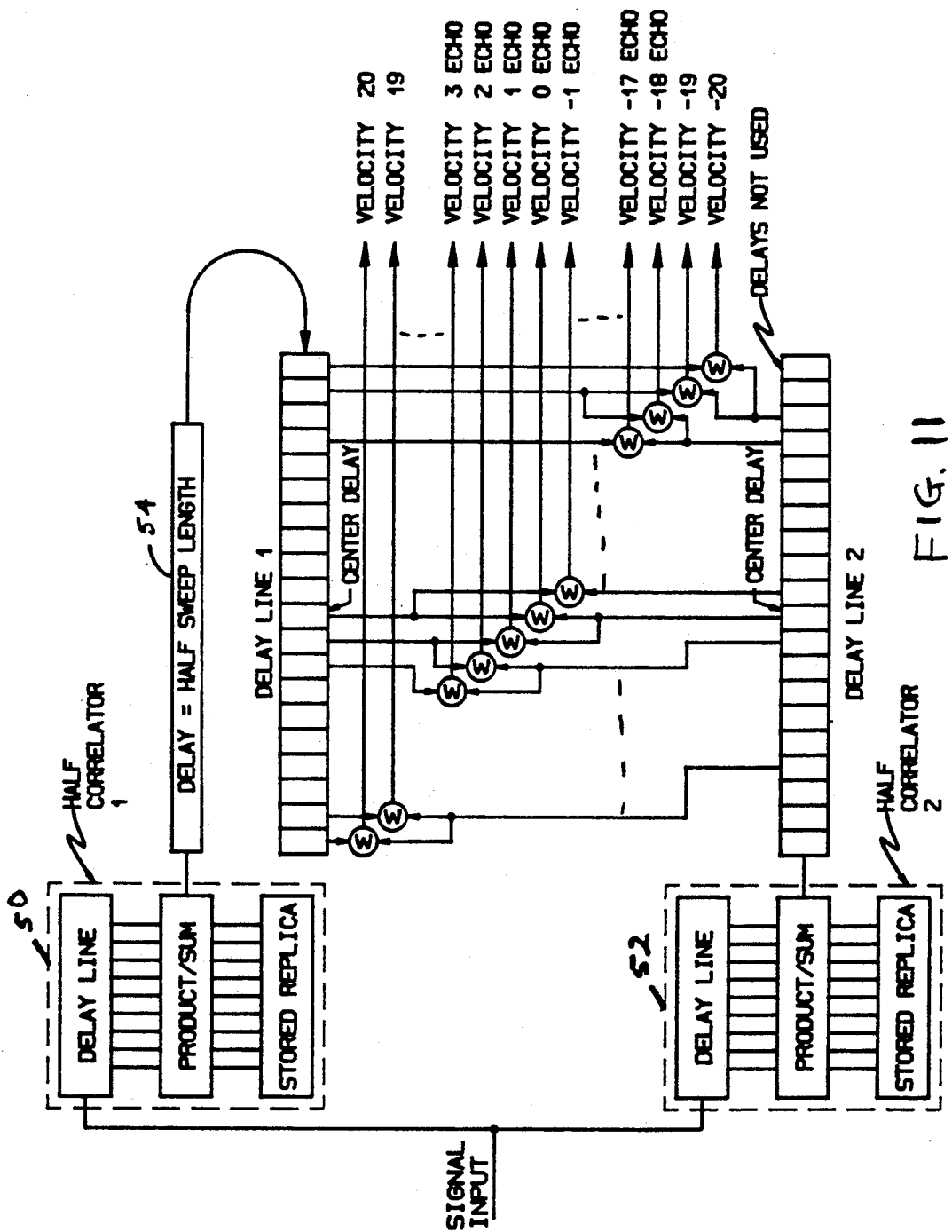
FIG. 11 is a block diagram of a processor for obtaining velocity information from a composite Doppler invariant echo signal in accordance with a further embodiment of the invention.

This signal is returned as a composite Doppler invariant echo signal. The signal is received at a receiver 12 (FIG. 15) and processing for beam forming and the like as is conventional in sonar or radar is performed on the signal in a processor 14. The composite signal segments can modulate a carrier at microwave frequencies in the radar case or at sonic frequencies in the sonar case. At the receiver, the signal maybe shifted by conventional heterodying techniques to a convenient frequency for sampling at least at twice the upper frequency limit of the shifted signal to satisfy the Nyquist criteria. At this point in the system the signal samples may be digitized and processed in correlators which may be frequency domain or time domain correlators. Such correlators are conventional and may be implemented either in software or in application specific integrated circuits. In FIG. 9, the correlators are identified as dual segment ridge line splitting correlators 16. A single correlator with outputs taken from each half of the correlator, or dual correlators, one for the up sweep segment and the other for the down sweep segment, are preferably used. In these correlators, the echo is correlated with replicas of the transmitted signal. FIG. 11 shows the correlators 50 and 52 as having a delay line in which the signal samples propagate, a memory for storing the replica ("stored replica") and a multiplying and adding logic unit ("product sum"). Thus, these correlators may be referred to as zero velocity correlators. The replicas may be stored digital replicas which are read out in synchronism with the samples as they are being correlated, all in accordance with well known correlator or matched filter techniques. The replica storage is indicated at 18 in FIG. 9 and at 20 in FIG. 15.

The correlation process requires only one correlator per segment of the composite Doppler invariant signal. For two segment signals, split or half correlators may be used, as will be more apparent from the more detailed diagrams of the embodiments of the correlation processor shown in FIGS. 10 and 11. In general, as shown in FIG. 9, each correlator detects a ridge line of the echo signal. Two outputs are provided, $TD(v)$ for the down sweep and $TU(v)$ for the up sweep. In other words, the correlators perform a time domain splitting function on the echo signal. This is illustrated in FIG. 15 by showing the correlators as an up sweep correlator 22 and a down sweep correlator 24. These dual returns or split echo signal outputs are then coherently combined in a delay and summer network 26 (FIG. 15) to provide a single maximum response in the Doppler bin output corresponding to the Doppler shifted echo input. The maximum response is obtained by a maximum amplitude detector 28 which searches for a maximum amplitude above a given threshold (to exclude much of the background noise and possible ambiguous echoes). The output of the detector is a channel number which corresponds the velocity bin and therefore the velocity of the target. This detector 28 includes low pass filters and rectifier circuits for eliminating the carrier or frequency shifted carrier.

In the general case, (FIG. 9) the delay and summer network and the maximum detector constitute a coherent ridge line crossing detector 30 with outputs ranging from zero velocity $(v_o)$ to velocities $v_n-$ and $v_n+$ representing incoming and outgoing targets. It will be appreciated that for each composite Doppler invariant echo signal there will be a single output from the lines $v_0 . . v_n- . . v_n+$, which output represents the velocity of the target. The system may readily be calibrated using return signals of known velocity for each of the outputs or bins.

The delay line and summer network maintain coherence with the carrier of the echo return outputs, such that the sum outputs are coherent at the carrier frequency, not simply incoherent at the height of the ridge line of the ambiguity function.

Figure 1:
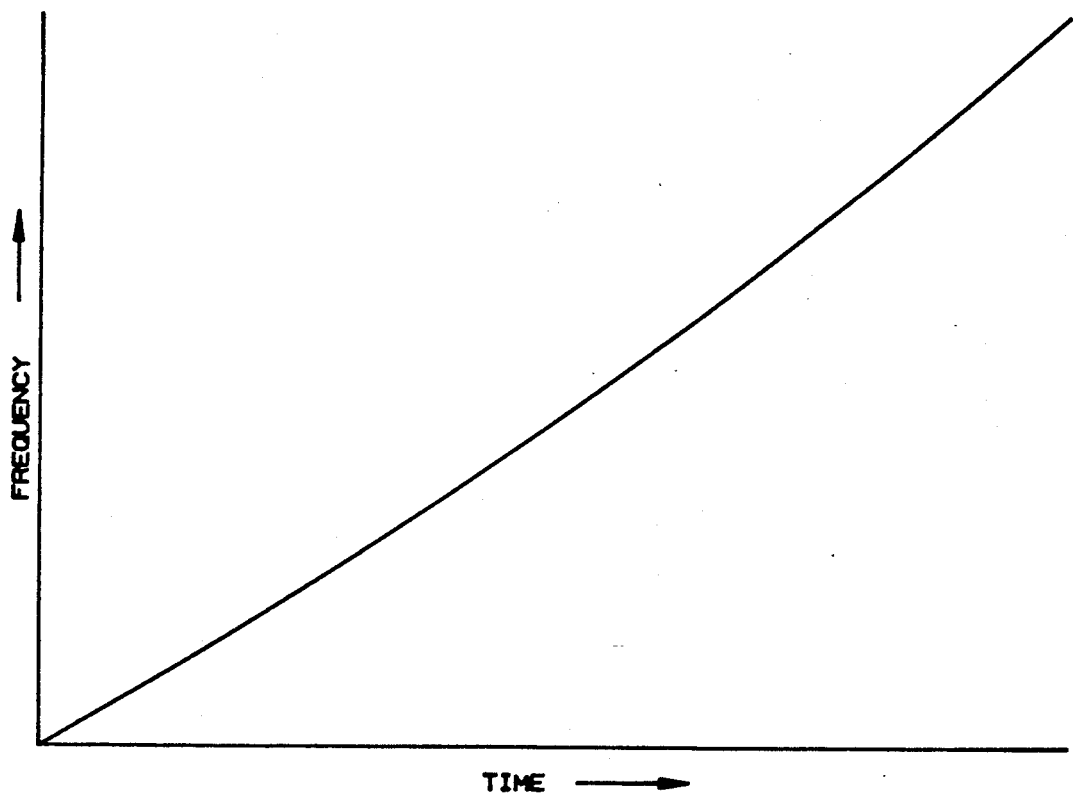
FIG. 1 is a plot of the frequency vs. time characteristic of a conventional HFM up sweep signal.
Figure 2:
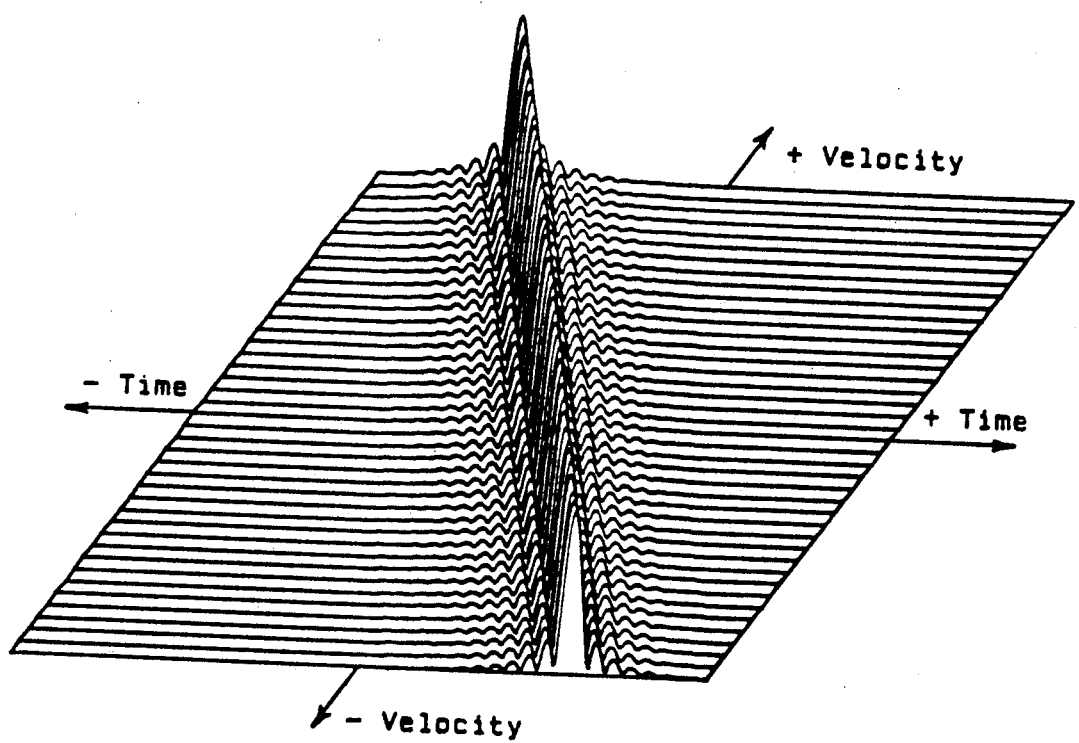
FIG. 2 is a plot of the ambiguity function of an up sweep HFM signal.
Figure 3:
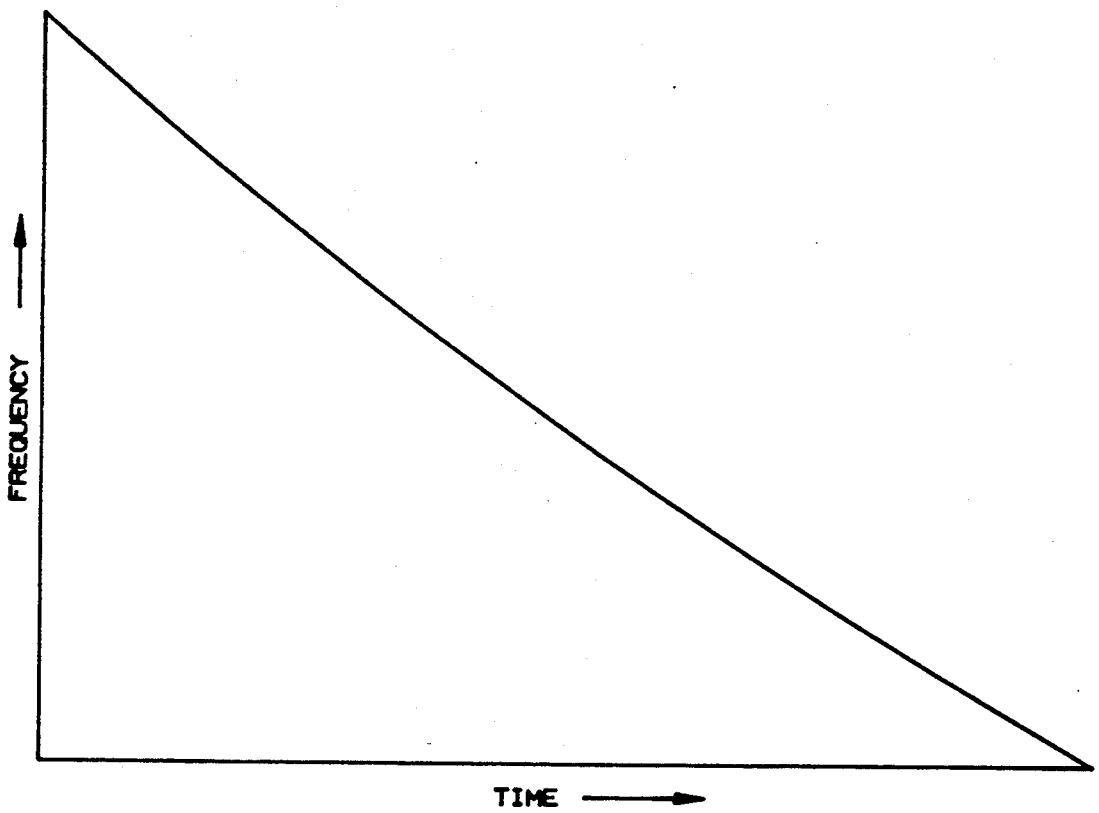
FIG. 3 is a curve showing the frequency vs. time relationship of a down sweep HFM signal.
Figure 4:
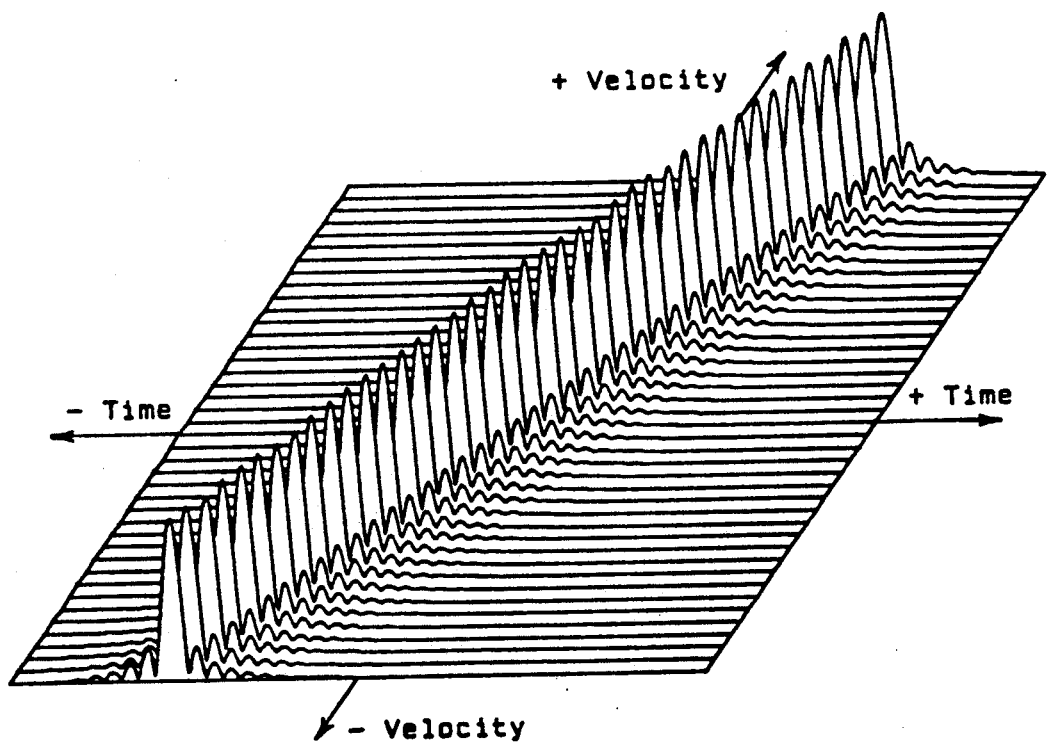
FIG. 4 is a plot of the ambiguity function of a down sweep HFM signal.
Figure 5:
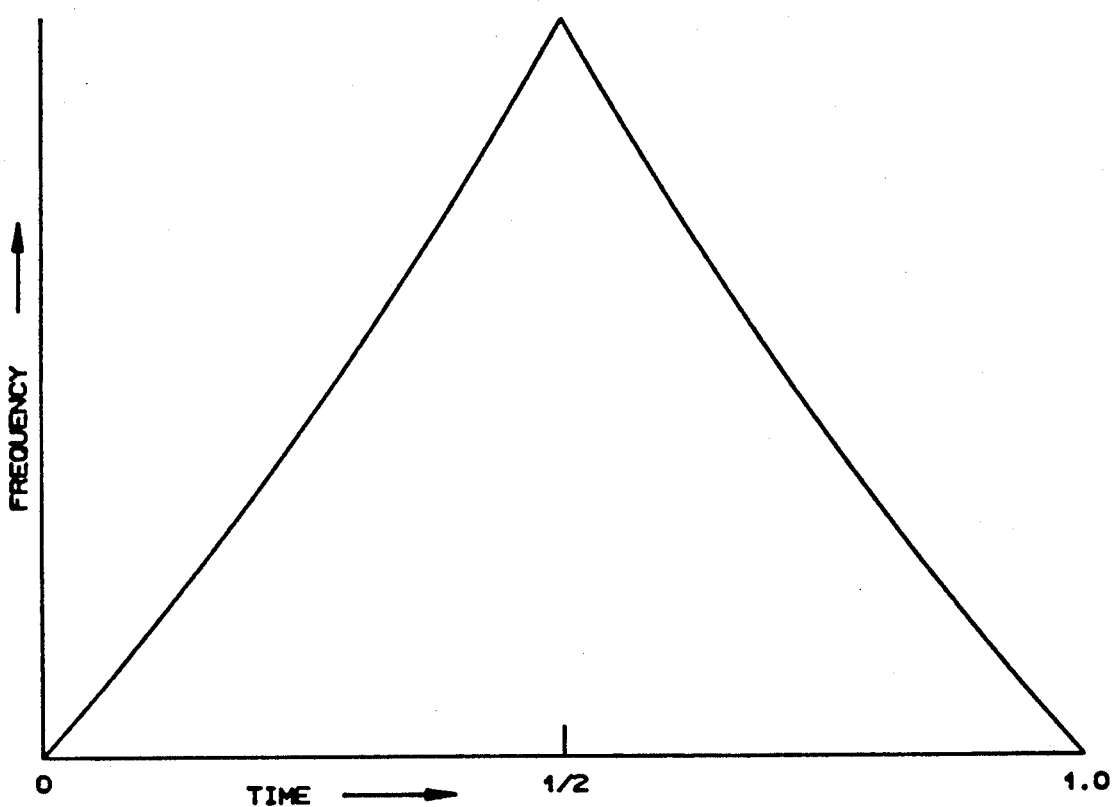
FIG. 5 is a plot of the frequency vs. time characteristic of a rooftop HFM signal.
Figure 5A:
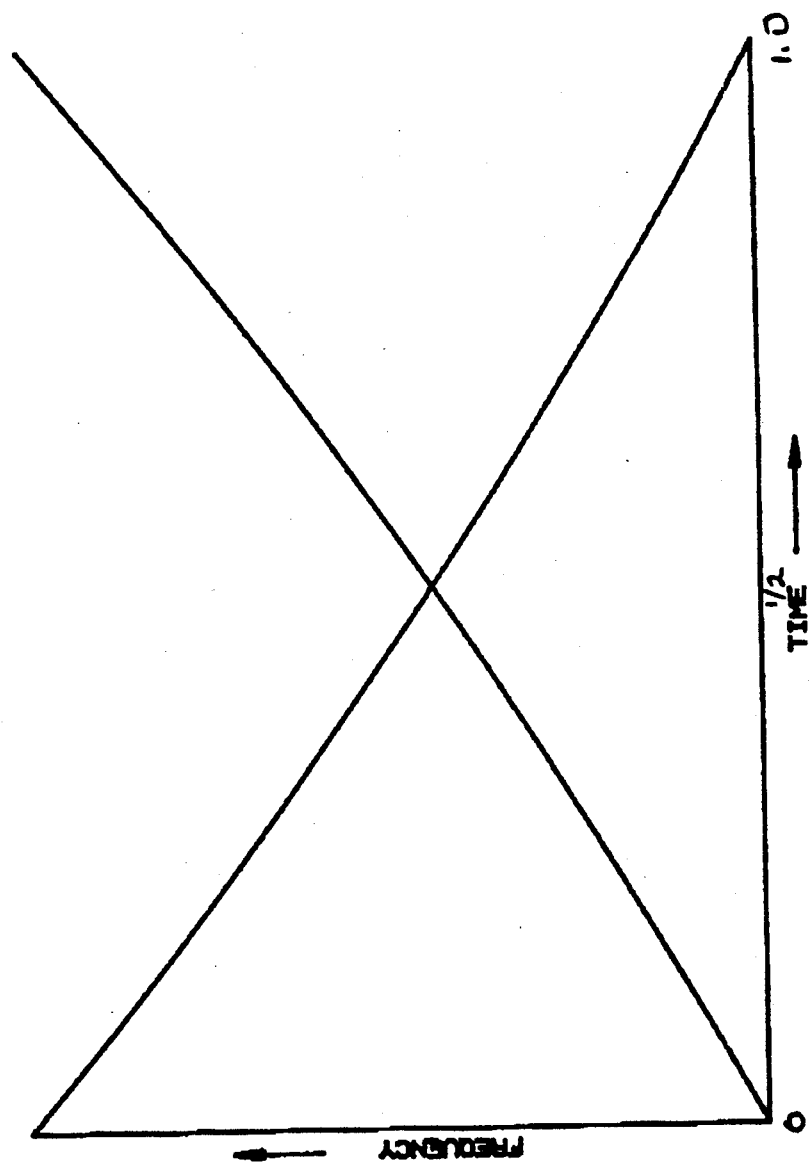
FIG. 5A is a plot of a roof top or vee type HFM signal where the signal segments occur simultaneously.
Figure 6:
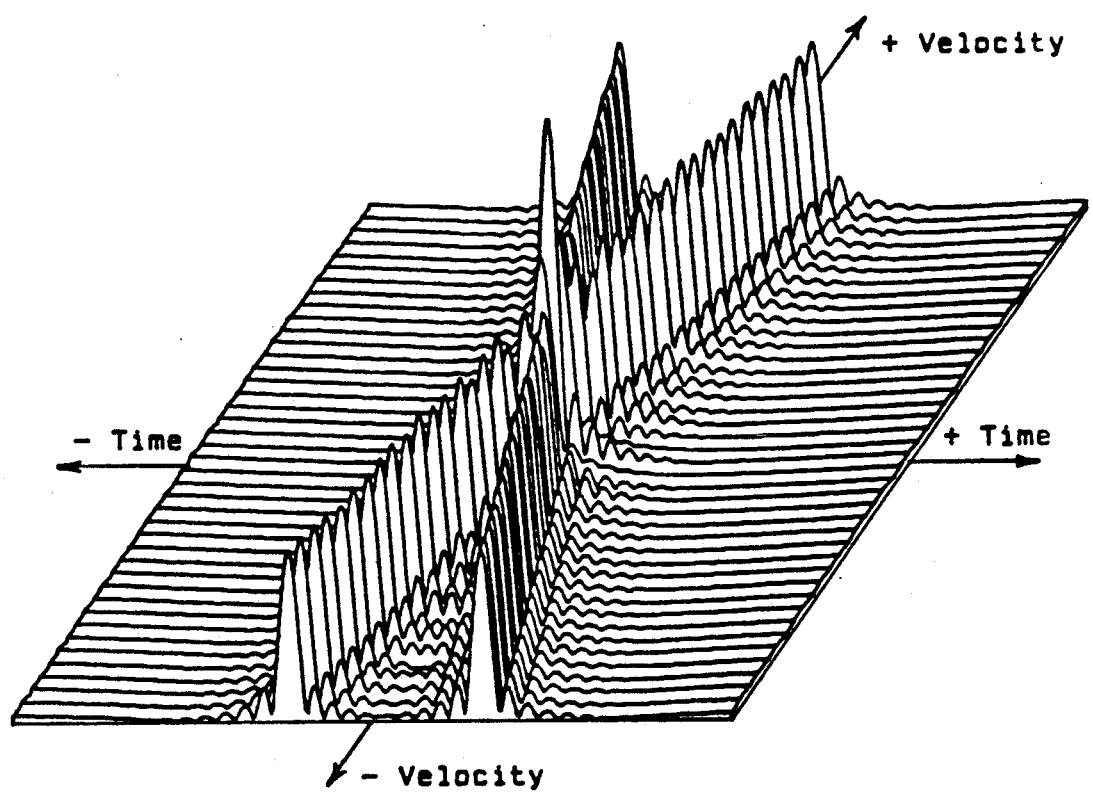
FIG. 6 is the ambiguity function of a rooftop HFM signal.
Figure 7:
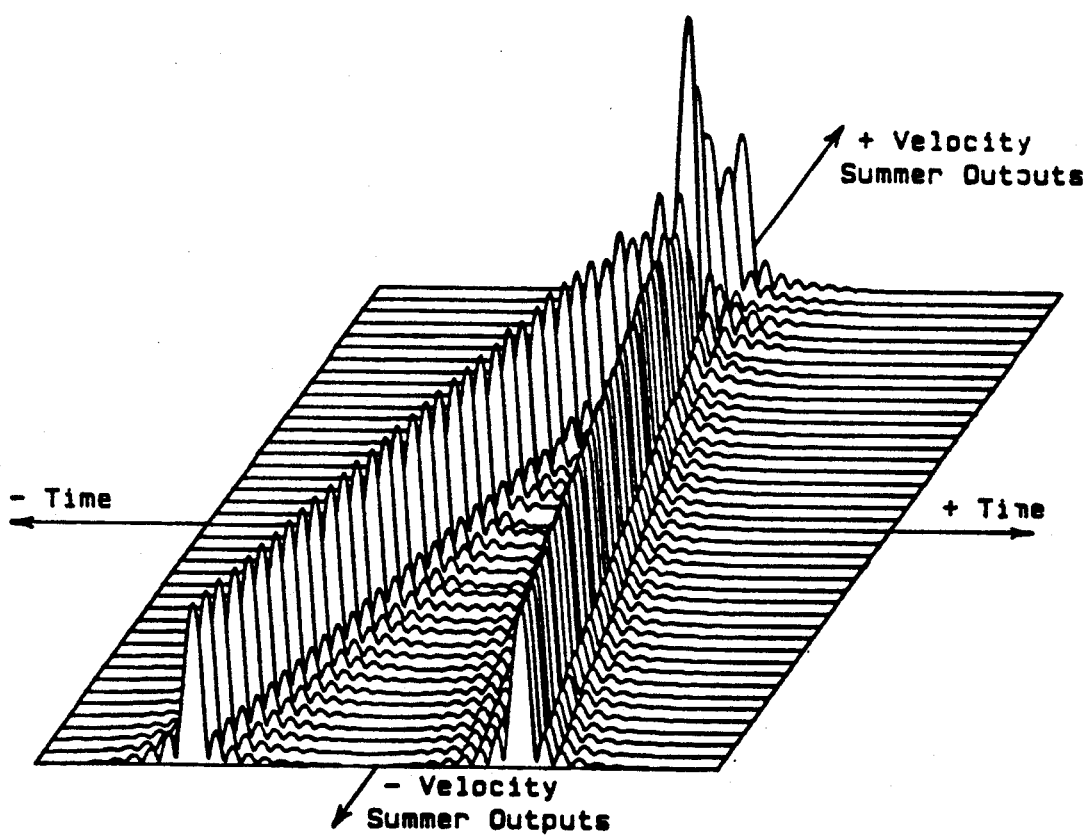
FIG. 7 is a plot similar to an ambiguity function of a rooftop HFM return as obtained at the output of the coherent ridge line crossing detector of FIG. 9 (the summers in FIG. 10) for an incoming target.
Figure 8:
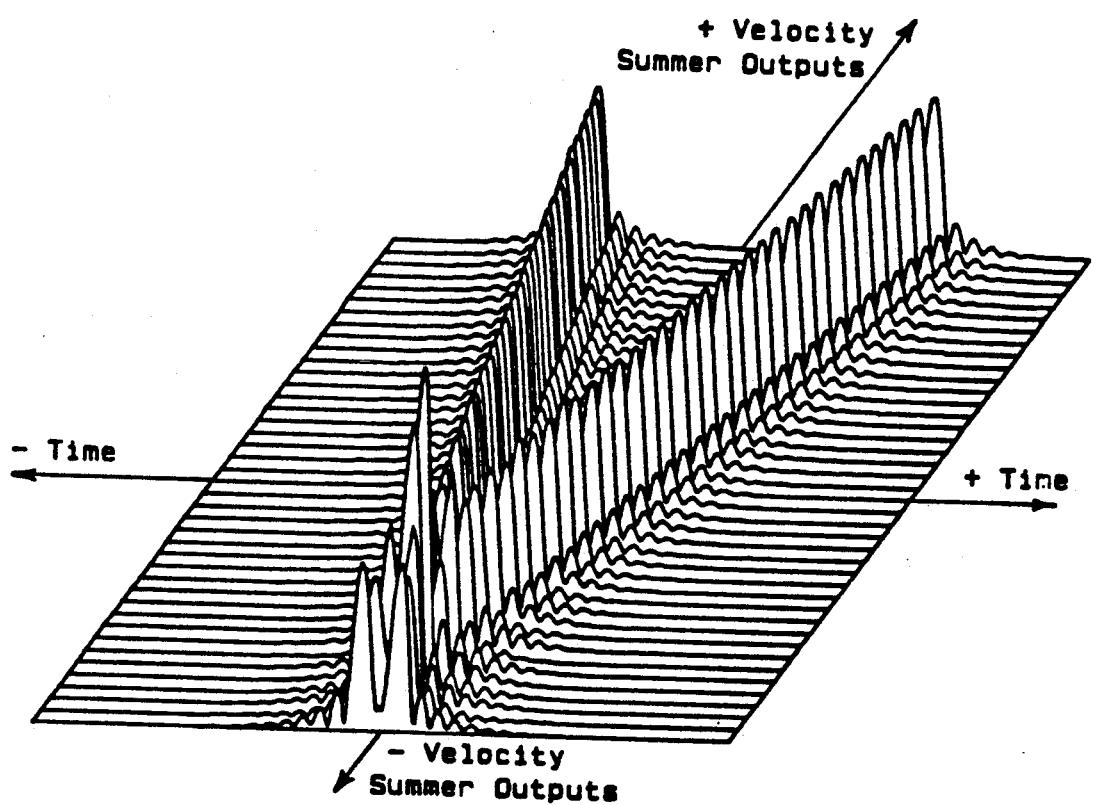
FIG. 8 is a plot similar to FIG. 7 for an outgoing target.

The summation process results in outputs which may be displayed in velocity-time space, and which appear as new ambiguity-like functions, as shown in FIGS. 7 and 8 for incoming and outgoing targets. In the case of a zero velocity target, the corresponding output will be similar to the signal ambiguity function as shown in FIG. 6. The summer functions of FIGS. 7 and 8 are obtained with the embodiment of the system shown in FIG. 10.

Each of these Figures representing the summer outputs shows a correlation peak of 1.00, with its location displaced from the velocity origin by the velocity of the target, and not displaced from the time origin, this location providing accurate measurement of target velocity and range. The time delays required in the time delay and summing process are short compared to the duration of the signal and therefore to the delays required in the correlation process. Accordingly, the use of the summation and delay networks in the system does not appreciably add to the cost of the correlators and evidences the economic benefit of the invention, especially over systems for velocity detection using banks of correlators as heretofore proposed.

It will be apparent from FIGS. 6, 7 and 8 that the maximum summer output occurs at a distinct point with respect to the time axis of the functions to represent the range of the target. The range detection may be implemented as shown in FIG. 15 simultaneously with velocity detection. First a delay network inserts a delay to compensate for delays in the correlation process. This delay network 32 interposes a delay after a start of transmission (SOT) pulse from the transmitter. The delay network 32 outputs a start of clock (SOCL) enable pulse to a clock generator 34. The number of clock pulses which is generated until the time of the maximum or peak amplitude signal obtained in the maximum signal amplitude detector 28 is collected in a counter 36. The counter counts the clock pulses from the clock 34 until inhibited by the maximum detector output. The counter thus stores the return time for the echo to return to the receiver. The counter output goes to a range display 38 which may display the range and also, if desired (but not shown), the velocity in terms of the channel number obtained from the maximum detector 28.

Figure 10:
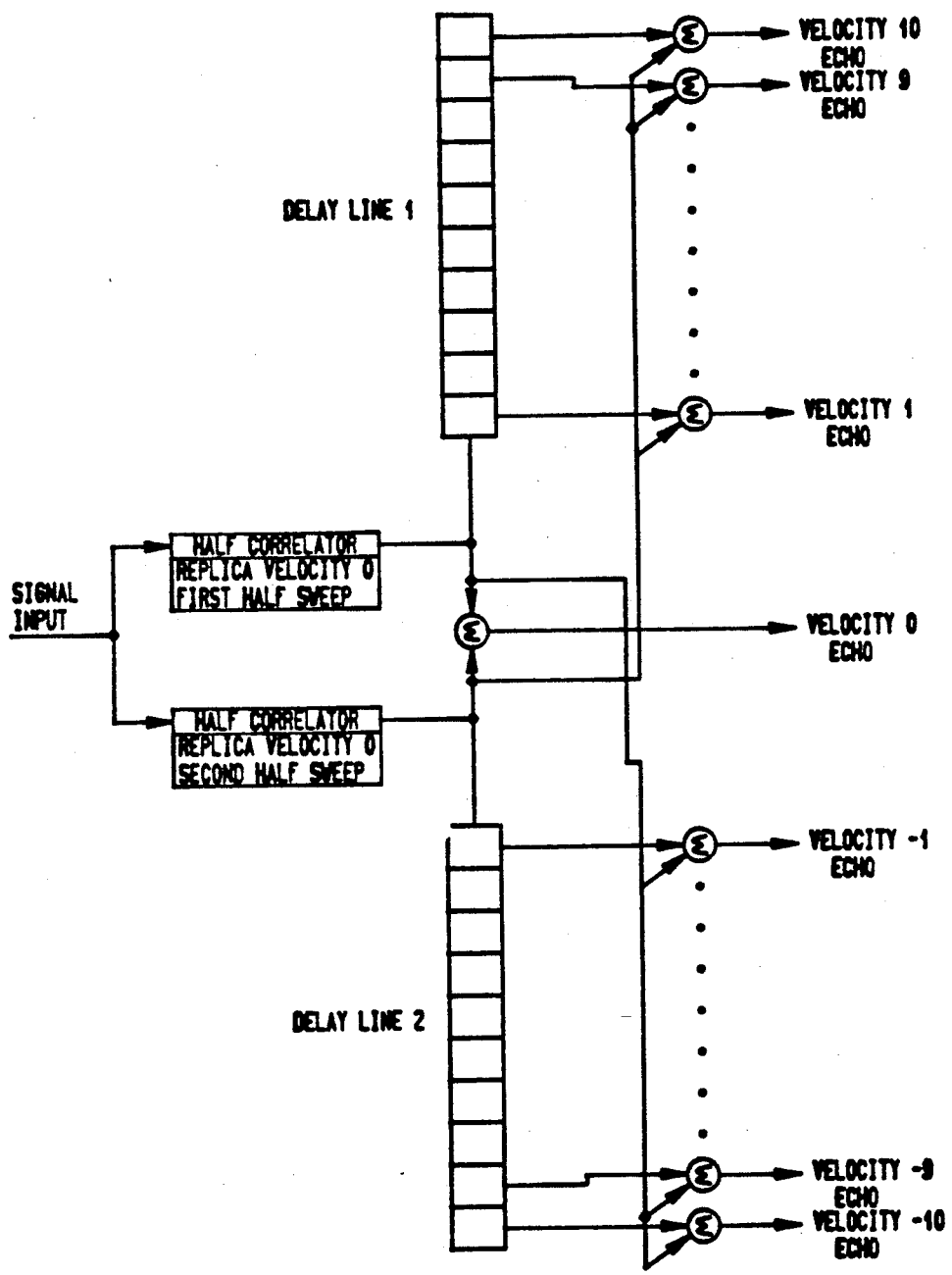
FIG. 10 is a simplified block diagram of the processor for obtaining velocity information from a composite Doppler invariant signal in accordance with an embodiment of the invention.

Referring to FIG. 10, the echo signal input is applied to half correlators 40 and 42 which receive zero velocity replicas of the first and second halves of the sweep (the first and second segments of the composite rooftop HFM signal if such a signal is used as the Doppler invariant composite signal). The outputs from the correlators are applied to two delay lines, delay line 1 and delay line 2. These delay lines may be shift registers which may be as wide as the number of bits in each byte of the sampled data which is output from the correlators 40 and 42. The clock rate (also known as tau step) which is used is desirably the same as in the correlators 40 and 42 (i.e., at the frequency at least twice the frequency of the carrier on which the Doppler invariant signal is modulated or its frequency shifted version). However, the length is much shorter than the correlation time and is determined solely by the maximum target velocity which is to be measured. Typically, the delay line lengths may be about 10% of the correlator time delay. Delay line 1 provides time delays for incoming targets while delay line 2 provides time delays for outgoing targets. The delay lines have taps for each bin which corresponds to a velocity bin. They are close to each other in accordance with the resolution of the velocity measurement. In the illustrated case, there are ten bins for outgoing targets and ten for incoming targets, as well as a zero velocity bin. When an echo arrives from a target with velocity, it will peak on one correlator before the other. This peak propagates down one delay line until the delay is reached when the peak exits from the other correlator. The tap at this delay time feeds one input to one of the summers ($\Sigma$), twenty-one of which are illustrated in FIG. 10, while the other correlator output feeds the other input of the summer. The summers produce the coherent sum of the two peaks thereby providing a gain of 6 dB for the return.

If the outputs of each correlator are not aligned because the target occurs at a velocity different than the velocity corresponding to the summer, there is no detection peak from the summer for that velocity. The noise from the two correlators 40 and 42 adds in place of the output peak. Such noise is random and on average will add as the square root of two larger than the noise from either correlator or by 3 dB. Thus the summing process and the use of both correlators improves the signal to noise ratio of the process by 3 dB.

If the transmission up sweep and down sweep each occupied one half of the transmission, there is a 3 dB loss due to the halving of the time band width product of the signal. The delay and summing networks therefore compensate for this 3 dB reduction. It is a feature of the invention that such compensation requires only one correlator per segment, e.g., two half correlators where a two segment roof top or vee signal is used, and delay lines and summers, instead of requiring a multiple (full) correlator bank, which is far more expensive.

As is shown in FIGS. 1 through 6, the composite signal segments have different time origins because they occur one after the other in the transmission. It is within the scope of the invention that the up sweep and down sweep be transmitted simultaneously during the transmission. This allows the signal to noise ratio to increase by 3 dB. The system then may require a pair of transmitters (radar transmitters or sonar projectors) for dual simultaneous transmission, particularly if the radiator (transmitter power amplifier, antenna, projector or other radiator) is not capable of handling the full peak output needed for two simultaneous signals. The time delays for the sweeps which produce the successive segments of the composite signal may be accommodated with a fixed delay line for the second half sweep or by calibration of the summer outputs.

Referring to FIG. 11, there is shown an improved processor of the Doppler invariant composite return signals. Two correlators or half correlators 50 and 52 are used and the output of the correlator which corresponds to the first segment is delayed by the sweep duration (half the sweep or transmission length in the case of the rooftop signal shown in FIG. 6). A fixed delay line 54 may be used for this purpose. The zero velocity replicas are stored and are considered part of the correlators 50 and 52 as in the case of the correlators 40 and 42 shown in FIG. 10. Two delay lines 56 and 58, delay line 1 and delay line 2, are used and the outputs from the correlators are propagated through these lines in inverse or opposite senses. The summers are connected to different taps on the lines. Summers on one side of the zero velocity tap receive inputs from the same tap on the other line and vice versa for the summers on the opposite side of the zero velocity taps. This connection of summers assures that all time steps are covered by the summer outputs. Of course, if less resolution is needed, several taps may be connected to the same summer and added together. In addition, if the noise causes the outputs from the summers to vary somewhat erratically, the outputs may be connected to smoothing circuits, such as digital filters, which then provide the velocity outputs.

Figure 11A:
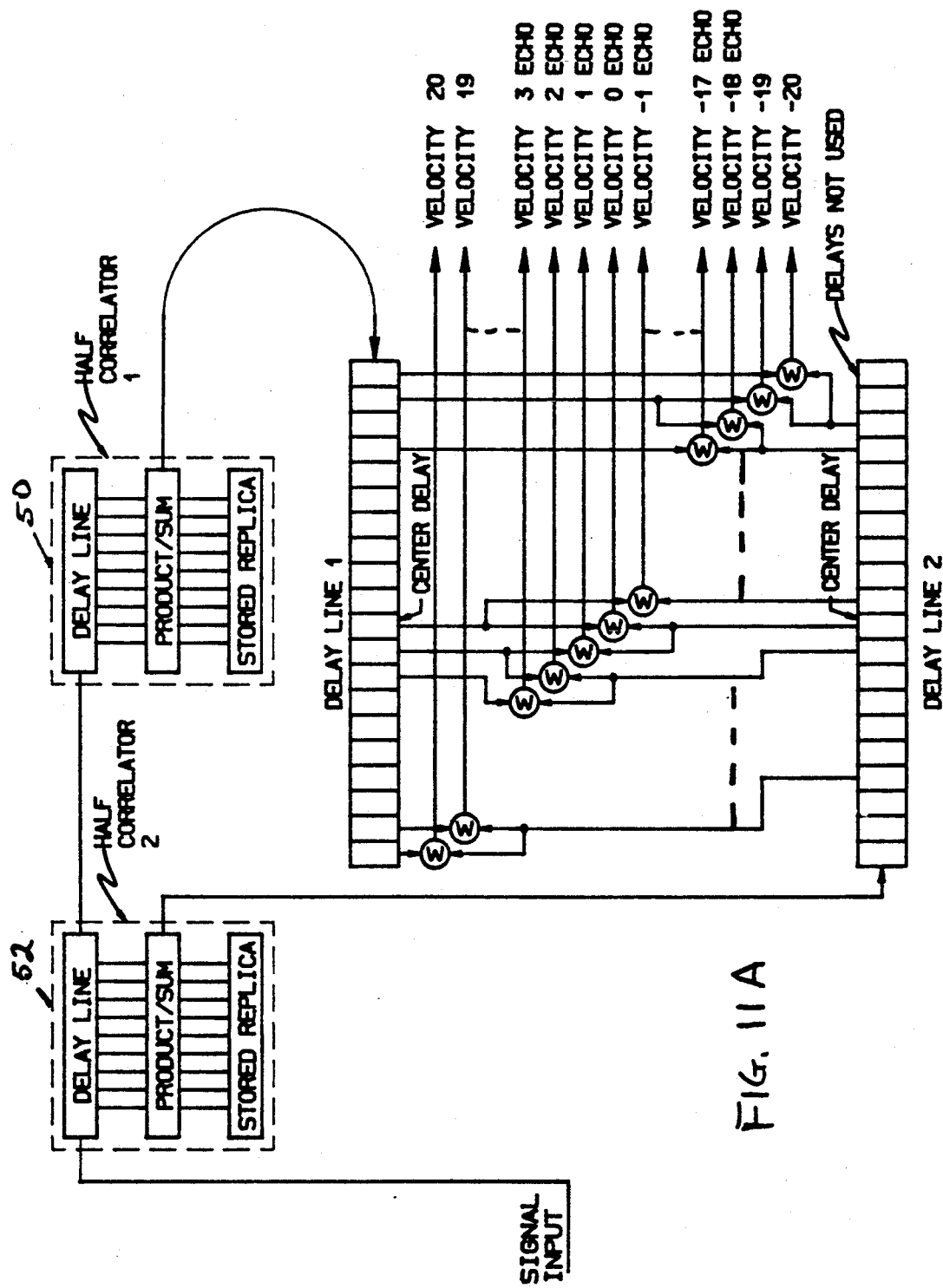
FIG. 11A is a block diagram similar to FIG. 11 wherein composite Doppler invariant echo signals having segments transmitted simultaneously during a transmission may be processed.

FIG. 11A represents an improvement over FIG. 11 in that the delay line 54 is replaced by using the delay of the delay line in the correlator 52. Otherwise, the systems operate similarly.

Figure 11B:
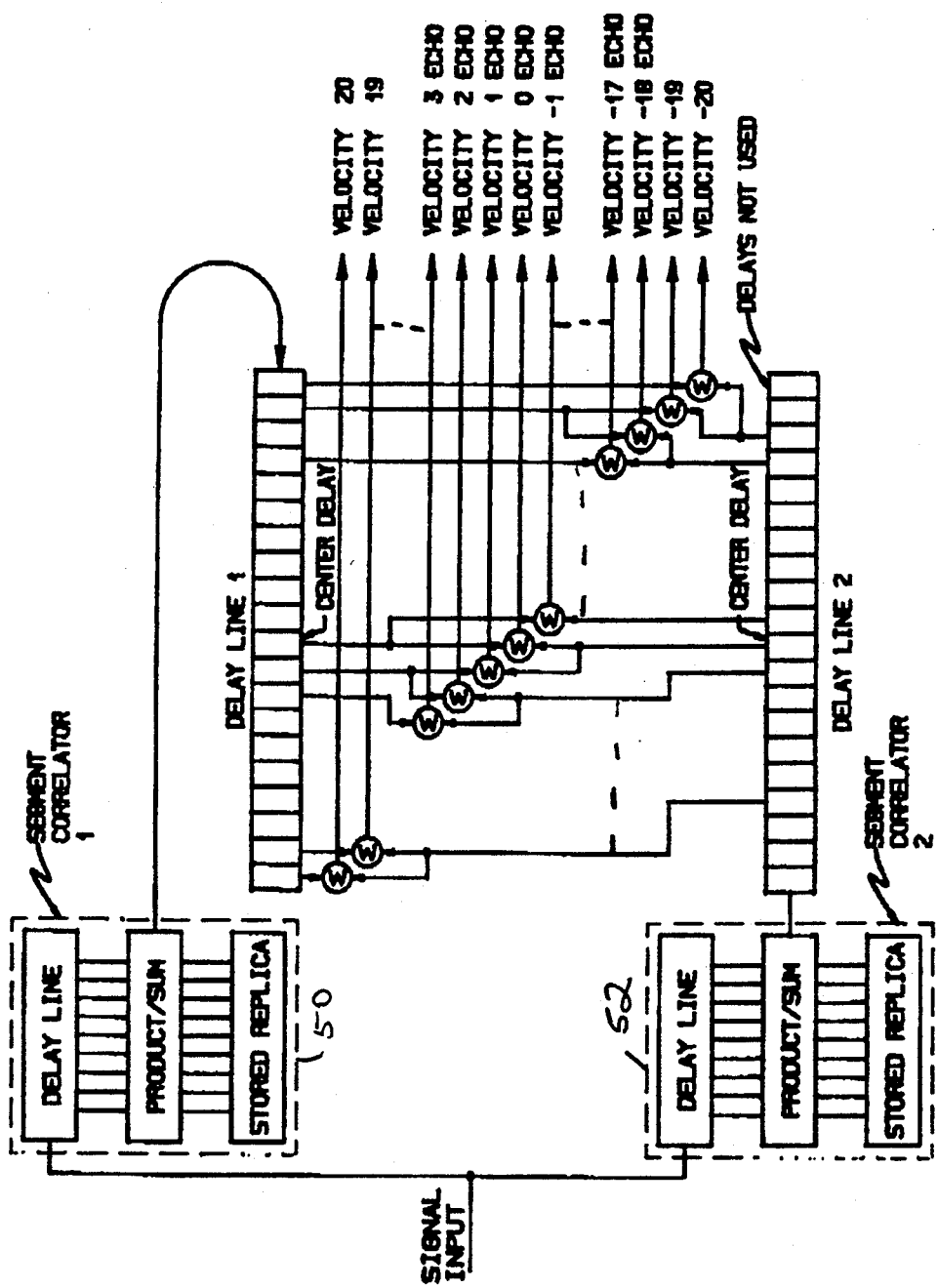
FIG. 11B is a block diagram of a processor similar to the processor of FIG. 11 wherein the delay is incorporated internally in the correlators.

FIG. 11B is designed to process simultaneously transmitted segments (such as illustrated in FIG. 6A). The delay line 54 to align the echo signal segments is not necessary and is omitted, otherwise the system of FIG. 11B operates like the system of FIG. 11.

Figure 12:
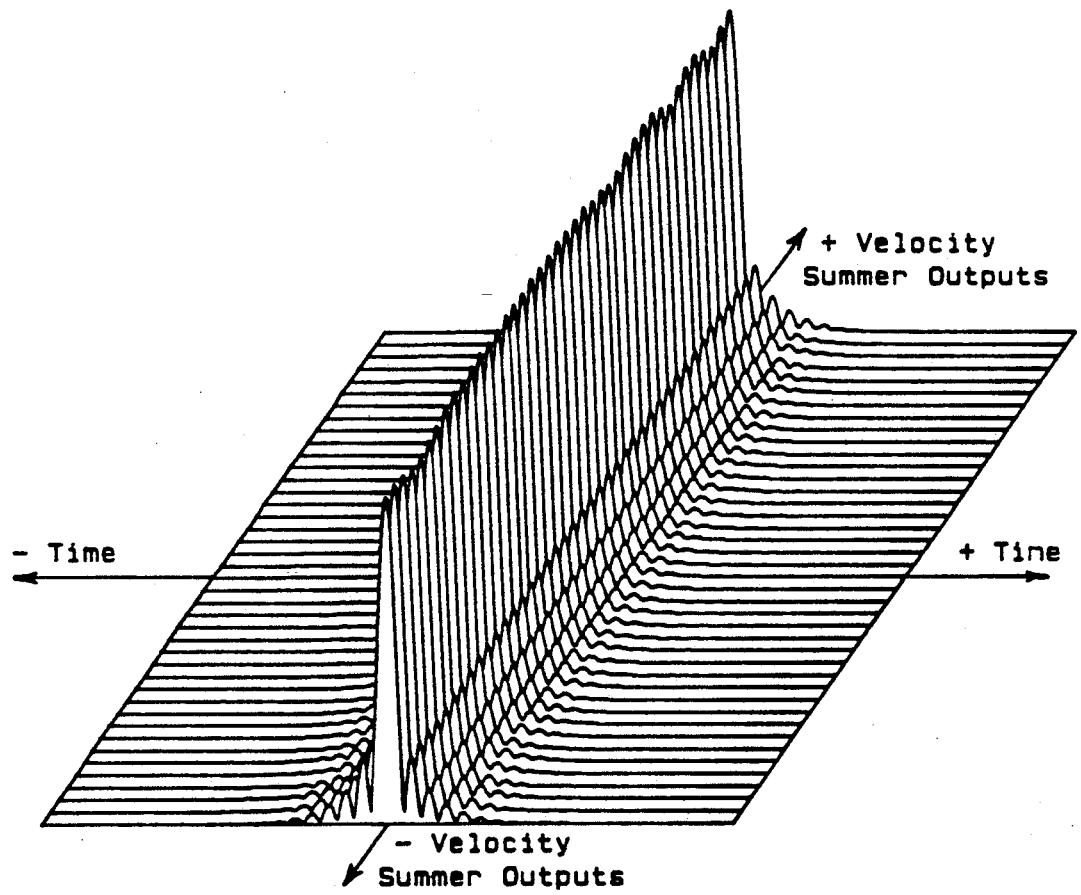
FIG. 12 is a plot similar to FIGS. 7 and 8 for the system shown in FIG. 11.

In order to translate the summer outputs to different velocities, successive signals corresponding to known velocity returns are applied to the system and the summer outputs for the returns which are peak or maximum are detected. In the case of the systems of FIGS. 10 and 11, the summation is done with the raw (not envelope detected) correlator outputs which contain the carrier or frequency shifted carrier itself. Therefore, the summation is coherent at the actual delay where the carriers are in phase. Full advantage and no degradation of the gain in signal to noise ratio (10 Log) of the time band width product is maintained. Since all possible delays are summed, one of the summer outputs, the one with the peak amplitude, constitutes the coherent summation corresponding to the velocity of the target. FIG. 12 shows the peaks for different velocities because of the connection of the delay line taps to the summers, the position of the peaks always remain centered at time zero, assuring correct range measurement.

Figure 13:
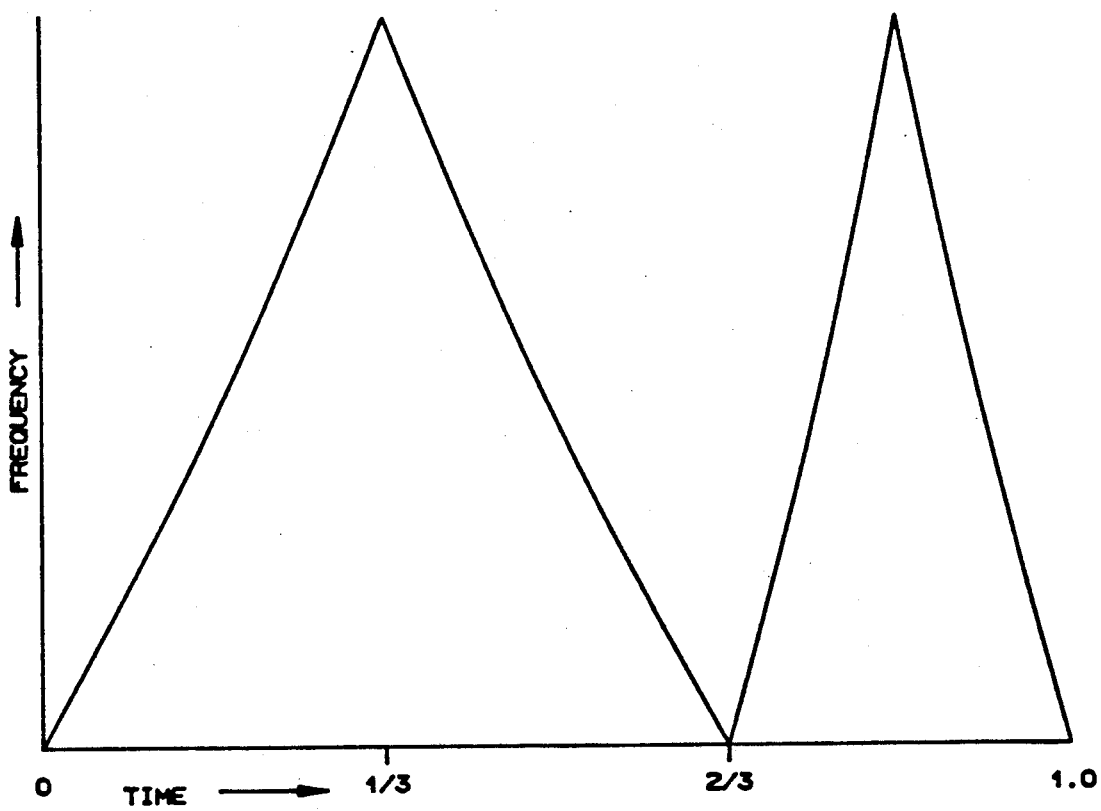
FIG. 13 is a frequency vs. time curve of a dual rooftop HFM signal.
Figure 14:
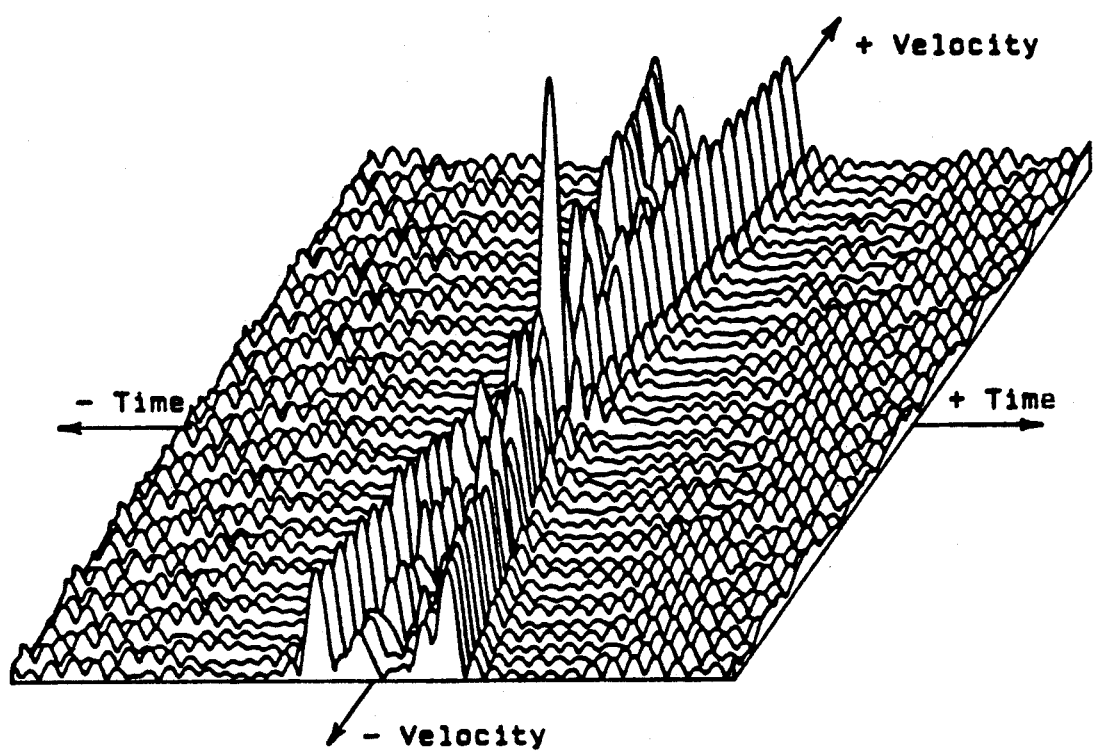
FIG. 14 is the ambiguity function of the signal shown in FIG. 13.

The system may be refined to suppress ambiguous echoes which might originate due to variations in the height of the ridge lines of the ambiguity functions produced by noise. In order to suppress such ambiguous echoes, it is desirable to reduce the amplitude of the ridge lines of the ambiguity functions. This may be accomplished by adding third or fourth sweeps or segments to the composite signal. A composite signal of dual rooftop waveform is illustrated in FIG. 13 where the first section covers two-thirds of the time of the transmission and the second covers one-third of the transmission's time. Because the sweep width of the second section is smaller than the first, the ridge lines, due to the second section segments, are of different slope than the ridge lines due to the first section. This results in an ambiguity function such as shown in FIG. 14 where the ridge lines are reduced from 0.5 normalized amplitude to 0.33 normalized amplitude or from −6 dB to −9.5 dB. An ambiguous target average amplitude is estimated to be about −11 dB and will be suppressed below the summer outputs. Either additional connections from additional correlators for the segments of the later section may be used, or inputs from the correlators for the later and smaller section segments may be added in the same summers as used in the two segment case illustrated in FIG. 10 and FIGS. 11, 11A and 11B.

From the foregoing description, it will be apparent that there has been provided an improved echo ranging system which provides both velocity and range sensitive detection from a single transmission using composite Doppler invariant signals as the transmission. Variations and modifications in the herein described embodiments of the invention, within the scope of the invention, will undoubtedly suggest themselves to those skilled in the art. Accordingly, the foregoing description should be taken as illustrative and not in a limiting sense.

I claim:

1. Apparatus for measuring simultaneously the velocity and range of a target which comprises means for generating a composite signal having a plurality of segments which define an ambiguity function in time and velocity having at least two ridge lines which have different time-velocity slopes and which intersect along the zero-velocity time axis of said ambiguity function, means for transmitting at a transmit time said composite signal in the direction of a target, means for receiving a composite return signal from said target following incidence of said composite signals thereon, means for correlating the composite return signal with replicas of each of said segments to transform the frequency shift of said target return due to the velocity thereof into outputs occurring in time-delayed relationships corresponding to the velocity and range of the target, and means for coherently summing said outputs in time-delayed relationship to produce a plurality of coherent sums from which target velocity and range are determinable.

2. A method for detecting simultaneously the velocity and range of a target which comprises the steps of generating a composite signal having a plurality of segments which define an ambiguity function in time and velocity having at least two ridge lines which have different time-velocity slopes and which intersect along the zero-velocity time axis of said ambiguity function, transmitting said composite signal at a certain time in the direction of a target, receiving a composite return signal from said target following incidence of said composite signal thereon, correlating the composite return signal with replicas of each of said segments to transform the frequency shift of said target return due to the velocity thereof into outputs occurring in time-delayed relationships corresponding to the velocity and range of the target, and said outputs coherently said outputs summing them in time-delayed relationship to produce a plurality of sums from which target velocity and range are determinable.

3. A method for detecting the velocity of a target which comprises the steps of generating a composite signal having a plurality of segments which define an ambiguity function in time and velocity having at least two intersecting ridge lines which have different time-velocity slopes, receiving a return signal from said target following incidence of said composite signal thereon, and correlating the return signal separately with replicas of each of said segments to transform the frequency shift of said return signal from said target due to the velocity thereof into coherently related outputs occurring in time-delayed relationship corresponding to the velocity of the target, and coherently summing said outputs in amplitude and phase in time-delayed relationship to provide a plurality of sums to determine said velocity.

4. The method according to claim 3 wherein each of said segments of said composite signal has a Doppler invariant waveform.

5. The method according to claim 4 wherein said composite signal has a duration containing the time interval of each of said segments thereof during which each said segment varies in frequency.

6. The method according to claim 5 wherein the instantaneous frequency, $f_i$, of each said segment at each instant during its time interval is $$f_i = F/(1-kt)$$

where F and k are constants during said segments.

7. The method according to claim 6 wherein said signal segments occur successively and said signal is a rooftop or vee HFM signal.

8. The method according to claim 5 wherein said signal segments are hyperbolic frequency modulated (HFM) signals.

9. The method according to claim 5 wherein said signal segments occur simultaneously within said duration.

10. The method according to claim 5 wherein said signal segments occur successively during said duration.

11. The method according to claim 4 wherein said composite signal includes a plurality of pairs of said signal segments each of which said pairs defines within said ambiguity function a different pair of ridge lines sloping in opposite directions with different slopes, and said correlating step provides a plurality of pairs of said outputs upon correlation of said return signal with replicas of each of said signal segments, said coherently combining step comprises coherently combining said outputs corresponding to different ones of said pairs of segments with different relative delays, and selecting from said combined outputs the one of maximum amplitude to identify the velocity of said target, in accordance with the relative delay producing said maximum amplitude, while suppressing ambiguous return signals from said target.

12. The method according to claim 3 wherein said outputs from said correlating step comprise a first output and a second output, and wherein said summing step is carried out by successively delaying each of said outputs and coherently summing each said successively delayed first output with each of said successively delayed second output to produce said plurality of coherent sums, and detecting the velocity of said target in accordance with the maximum amplitude one of said sums.

13. The method according to claim 12 wherein said step of successively delaying said outputs is carried out by propogating each of said outputs along different delay lines having successive taps, and said summing step is carried out with the aid of a plurality of summers, each of said summers being connected to different taps of different ones of said lines.

14. The method according to claim 13 wherein said generating step further comprises modulating a carrier having a higher frequency than the highest frequency of said composite signal with said composite signal, and said receiving step includes the step of recovering said return signal as a signal coherent with said modulated carrier signal at said carrier frequency or a frequency shifted from said carrier frequency and providing said output as samples at a rate at least twice the frequency of said return signal as recovered during said recovering step, said propagating step is carried out by propagating said samples along said delay line and said summing step is carried out by coherently summing said samples at each of said taps.

15. The method according to claim 3 wherein said outputs comprise at least a first output and second output, and said summing step is carried out by successively delaying said first and second outputs to provide a first succession of successively delayed second outputs, and coherently summing said first and second successions of outputs in inverse time order to produce said plurality of coherent sums thereof, the one of said sums which is of maximum amplitude corresponding to the velocity of said target.

16. The method according to claim 15 wherein said successively delaying step is carried out by propagating said first and second outputs along first and second delay lines having successive taps, and said summing step is carried out with the aid of a plurality of summers connected to taps which are progressively closer to opposite ends of said first and second delay lines.

17. The method according to claim 16 wherein said generating step further comprises modulating a carrier having a higher frequency than the highest frequency of said composite signal with said composite signal, and said receiving step includes the step of recovering said return signal as a signal coherent with said modulated carrier signal at said carrier frequency or providing said output as samples at a rate at least twice the frequency of said return signal as recovered during said recovering step, said propagating step is carried out by propagating said samples along said delay line, and said summing step is carried out by coherently summing said samples at each of said taps.

18. The method according to claim 3 wherein said signal segments of said composite signals are transmitted at the same time.

19. The method according to claim 3 wherein said different slopes are in opposite directions.

20. The method according to claim 19 wherein said ridge lines slant in opposite directions with respect to the time axis of said function.

21. The method according to claim 3 wherein said replicas are zero velocity replicas.

22. In an echo-ranging system, which illuminates an object with a composite signal transmission having first and second components which sweep in time and opposite directions with respect to frequency and which is returned as a return signal from said object, a system for detecting the velocity of said object which comprises means for correlating said return signal with replicas of said components to provide a pair of outputs corresponding to said first and second components, and means for delaying and coherently summing said outputs to produce a plurality of coherent sums, and means for detecting the velocity of said object from said plurality of sums.

23. The velocity detecting system according to claim 22, wherein said transmission is a composite Doppler invariant FM transmission, and said detecting means includes means responsive to the one of said plurality of sums which is maximum, identifying said velocity.

24. The system according to claim 23 further comprising means responsive to said one of said sums for detecting the range of said object from a reference location.

25. The system according to claim 22 wherein said summing combining means includes means for relatively delaying said pair of outputs to provide a plurality of further outputs having different relative delays, and means for summing said further delayed outputs to provide a plurality of summer outputs, and means responsive to said summer outputs for detecting said velocity.

26. Apparatus for detecting the velocity of a target which comprises means for generating a composite signal having a plurality of segments which define an ambiguity function in time and velocity having at least two intersecting ridge lines which have different time-velocity slopes, means for receiving a return signal from said target upon incidence of said composite signal thereon, means for correlating the return signal with replicas of each of said segments to transform the frequency shift of said return signal from said target due to the velocity thereof into coherently related outputs occurring in time-delayed relationship corresponding to the velocity of said target, and summing said outputs to provide a plurality of coherent sums to detect said velocity.

27. The apparatus according to claim 26 wherein each segment of said composite signal has a Doppler invariant waveform.

28. The apparatus according to claim 27 wherein said composite signal has a duration containing each said segment thereof during which each said segment varies in frequency.

29. The apparatus according to claim 28 wherein the instantaneous frequency, $f_i$, of each said segment at each instant during its time interval is $$f_i = F/(1-kt)$$

where F and k are constants during said segments.

30. The apparatus according to claim 28 wherein said signal segments are hyperbolic frequency modulated (HFM) signals.

31. The apparatus according to claim 28 wherein said generating means includes means for producing said signal segments simultaneously within said duration.

32. The apparatus according to claim 28 wherein said generating means includes means for producing said signal segments successively during said duration.

33. The apparatus according to claim 28 wherein said generating means includes means for producing said signal as a rooftop or vee HFM signal.

34. The apparatus according to claim 28 wherein said composite signal includes a plurality of pairs of signal segments, each pair of said signal segments defining within said ambiguity function a different pair of ridge lines sloping in opposite directions with different slopes, and said correlating means including means for providing a plurality of pairs of said outputs upon correlation of said return signal with replicas of said signal segments.

35. The apparatus according to claim, 26 wherein said outputs comprise a first output and a second output, and wherein said summing means comprises means for successively delaying said outputs and coherently summing each said successively delayed first output with each said successively delayed second output to produce said plurality of coherent sums, and means for detecting the velocity of said target in accordance with the maximum amplitude one of said sums.

36. The apparatus according to claim 35 wherein said means for successively delaying said outputs includes first and second delay lines having successive taps, means for propagating said first output and said second output, respectively, along said first delay line and said second delay line, and said summing means includes a plurality of summers each of said summers being connected to a different taps of different ones of said lines.

37. The apparatus according to claim 36 wherein said generating means further comprises means for modulating a carrier having a higher frequency than the highest frequency of said composite signal with said composite signal, and said receiving means includes means for recovering said return signal as a signal coherent with said modulated carrier signal at said carrier frequency or a frequency shifted from said carrier frequency and for providing said output as samples at a rate at least twice the frequency of said return signal as recovered by said receiving means, said propagating means being operative to propagate said samples along said delay line, and said summing means being operative to sum said samples at each of said taps.

38. The apparatus according to claim, 26 wherein said outputs comprise at least a first output and a second output, and said summing means comprises means for successively delaying said first and second outputs to provide a first succession of successively delayed first outputs and a second succession of successively delayed second outputs, and means for coherently summing said first and second successions of outputs in inverse time order to produce said plurality of coherent sums thereof, the one of said sums which is of maximum amplitude corresponding to the velocity of said target.

39. The apparatus according to claim 38 wherein said successively delaying means comprises first and second delay lines having successive taps, and means for propagating said first and second outputs along said first and second delay lines, and said summing means comprises a plurality of summers connected to taps which are progressively closer to opposite ends of said first and second delay lines.

40. The apparatus according to claim 39 wherein said generating means further comprises means for modulating a carrier having a higher frequency than the highest frequency of said composite signal with said composite signal, and said receiving means includes means for recovering said return signal as a signal coherent with said modulated carrier signal at said carrier frequency or a frequency shifted from said carrier frequency and providing said output as samples at a rate at least twice the frequency of said return signal as recovered by said receiving means, said propagating means being operative to propagate said samples along said delay line, and said summing means being operative to sum said samples at each of said taps.

41. The apparatus according to claim 26 further comprising means for measuring the range of said target in response to the one of said plurality of coherent sums from which said velocity is obtained.

42. The apparatus according to claim 26 wherein said replicas are zero velocity replicas.

43. The apparatus according to claim 1 further comprising means for determining said target velocity and range from the one sum of said plurality exhibiting the highest magnitude.

44. The method according to claim 2 further comprising the step of determining said target velocity and range from the one sum of said plurality exhibiting the highest magnitude.

45. The system according to claim 22 wherein said means responsive to said plurality of coherent sums includes means for providing at least one combined output which is maximum identifying said velocity.

46. The apparatus according to claim 26 in which said plurality of coherent sums includes at least one sum which is maximum identifying said velocity.

* * * * *

UNITED STATES PATENT AND TRADEMARK OFFICE
CERTIFICATE OF CORRECTION

PATENT NO. : 5,212,489
DATED : May 18, 1993
INVENTOR(S) : David E. Nelson

It is certified that error appears in the above-indentified patent and that said Letters Patent is hereby corrected as shown below:

Column 9, line 17, claim 2, cancel "combining said outputs" and "by" and substitute for "them", —said outputs —.

Signed and Sealed this

Thirtieth Day of May, 1995

Attest:

BRUCE LEHMAN

Attesting Officer      Commissioner of Patents and Trademarks